United States Patent
Tsuji

(10) Patent No.: US 8,035,351 B2
(45) Date of Patent: Oct. 11, 2011

(54) INFORMATION PROCESSING APPARATUS

(75) Inventor: Kazuhiko Tsuji, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 23 days.

(21) Appl. No.: 12/725,384

(22) Filed: Mar. 16, 2010

(65) Prior Publication Data

US 2010/0277130 A1 Nov. 4, 2010

(30) Foreign Application Priority Data

Apr. 30, 2009 (JP) ................................. 2009-111284

(51) Int. Cl.
*H02J 7/04* (2006.01)
*H02J 7/00* (2006.01)
(52) U.S. Cl. .................. 320/152; 320/125; 320/132
(58) Field of Classification Search .................. 320/152
See application file for complete search history.

(56) References Cited

U.S. PATENT DOCUMENTS

| | | | |
|---|---|---|---|
| 5,796,982 A * | 8/1998 | Iwami et al. | 703/18 |
| 6,657,415 B2 * | 12/2003 | Saeki et al. | 320/125 |
| 2006/0082346 A1 * | 4/2006 | Nagasawa | 320/150 |
| 2007/0013345 A1 * | 1/2007 | Ikeda et al. | 320/150 |

FOREIGN PATENT DOCUMENTS

| | | |
|---|---|---|
| JP | 08-098426 A | 4/1996 |
| JP | 11-122839 A | 4/1999 |
| JP | 11-252814 A | 9/1999 |
| JP | 2001-128386 | 5/2001 |
| JP | 2001-128386 A | 5/2001 |
| JP | 2006-304572 A | 11/2006 |
| JP | 2009-077466 A | 4/2009 |

OTHER PUBLICATIONS

Information Sheet in one page.
Notice of Reasons for Rejection mailed by Japan Patent Office on Jul. 13, 2010 in the corresponding Japanese patent application No. 2009-111284.

* cited by examiner

*Primary Examiner* — Patrick Assouad
*Assistant Examiner* — M'baye Diao
(74) *Attorney, Agent, or Firm* — Knobbe, Martens, Olson & Bear LLP

(57) ABSTRACT

According to one embodiment, an information processing apparatus powered by a battery and an external power supply, comprises a power supply circuit which comprises a temperature sensor and converts power obtained from the external power supply and supplies a first charge current to the battery, and a controller which supplies a current to the battery with a second charge current smaller than the first charge current if a temperature received from the temperature sensor has exceeded a threshold, and supplies the current to the battery with the first charge current if both the temperature received from the temperature sensor and a battery level have exceeded corresponding thresholds.

6 Claims, 5 Drawing Sheets

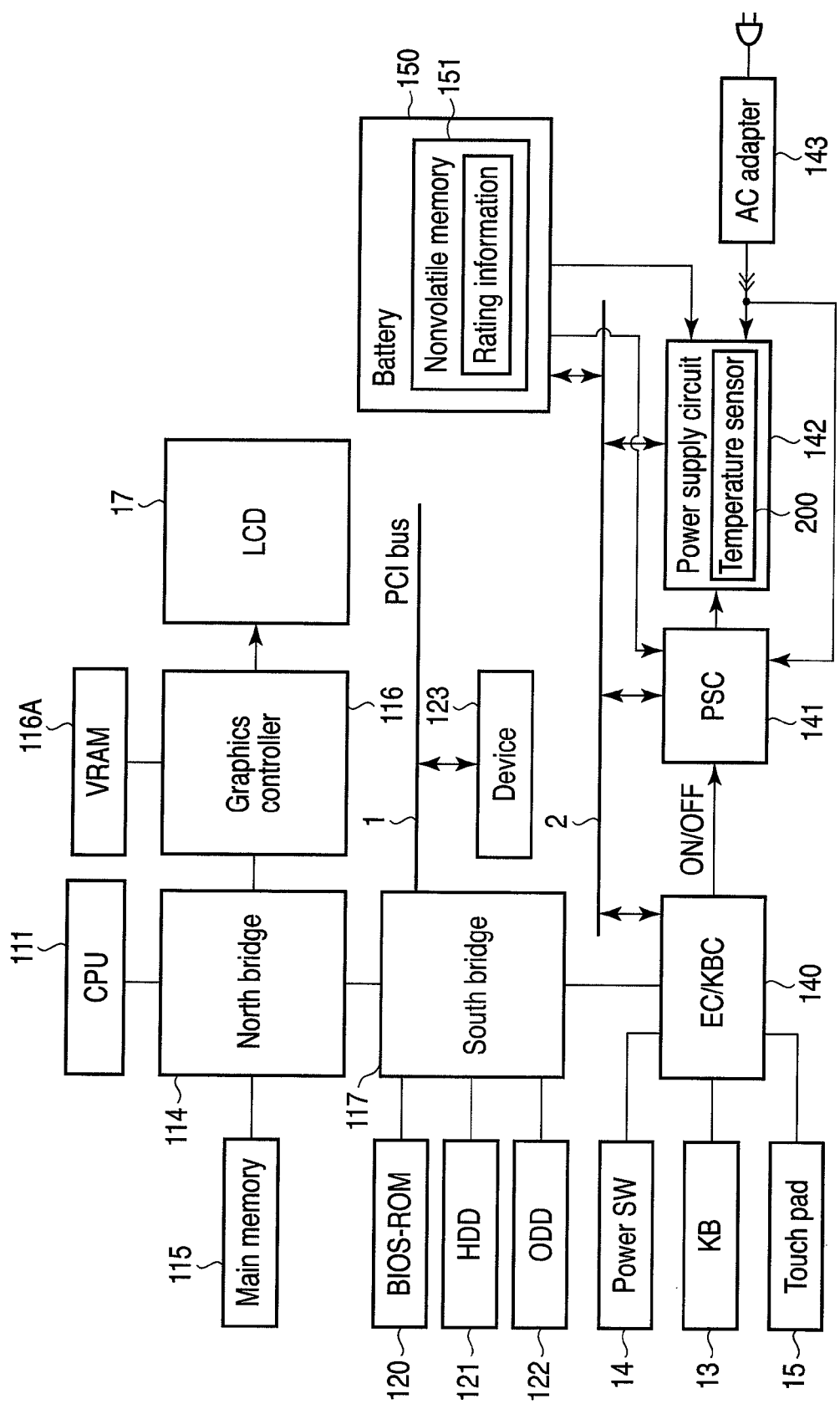
F I G. 2

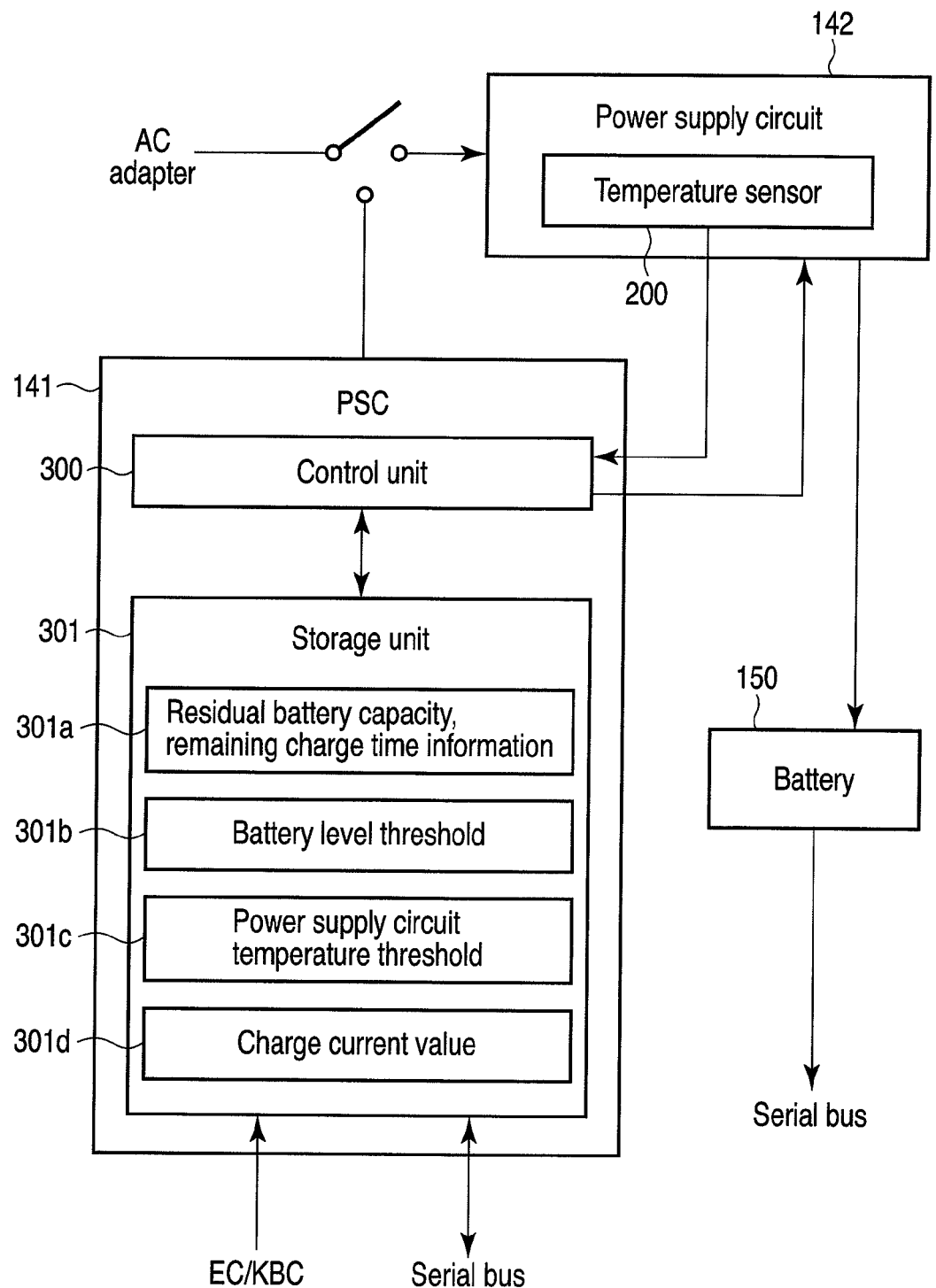
F I G. 3

|  |  | Temperature rise parameter | Remaining charge amount and charge time ||||
|---|---|---|---|---|---|---|
|  |  |  | ~20% | ~40% | ~50% | ~80% |
| Charge current | 1.0A | Δ0.3°C/0.1h | 3.2h | 2.4h | 1.6h | 0.8h |
|  | 2.0A | Δ0.7°C/0.1h | 1.6h | 1.2h | 0.8h | 0.4h |
|  | 3.0A | Δ1.5°C/0.1h | 1.1h | 0.8h | 0.5h | 0.3h |
|  | 4.0A | Δ4°C/0.1h | 0.8h | 0.6h | 0.4h | 0.2h |
|  | 5.0A | Δ6°C/0.1h | 0.6h | 0.5h | 0.3h | 0.2h |

FIG. 5

| First temperature threshold | 50°C |
|---|---|
| Second temperature threshold | 60°C |
| Residual capacity threshold (remaining charge amount) | 80% |

FIG. 6

INFORMATION PROCESSING APPARATUS

CROSS-REFERENCE TO RELATED APPLICATIONS

This application is based upon and claims the benefit of priority from Japanese Patent Application No. 2009-111284, filed Apr. 30, 2009, the entire contents of which are incorporated herein by reference.

BACKGROUND

1. Field

One embodiment of the present invention relates to an information processing apparatus which controls charge of a battery for driving an information processing apparatus such as a personal computer.

2. Description of the Related Art

A battery for driving an information processing apparatus such as a personal computer generally uses a chargeable secondary cell. Such a battery degrades its performance when quickly charged at a high battery temperature. Hence, a hot battery needs to undergo normal charge because quick charge can be done only after the battery has cooled down. Jpn. Pat. Appln. KOKAI Publication No. 2001-128386 discloses a technique of performing quick charge upon determining that the risk of battery performance degradation caused by quick charge of a hot battery would not be so high if a residual battery capacity detection result indicates that the battery is almost fully charged and can completely be charged within a short time.

In the above-described technique of Jpn. Pat. Appln. KOKAI Publication No. 2001-128386, however, monitoring the temperature of the battery main body is of little significance because a chargeable secondary cell originally has temperature resistance to some extent. If the battery temperature exceeds a threshold during charge, the charge may stop even if the residual battery capacity indicates almost full charge. That is, it is impossible to control not to make the battery temperature exceed the threshold during charge to fully charge the battery. Hence, charge control needs to be done in accordance with the residual capacity and an increase in the battery temperature during charge.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary block diagram showing an exemplary system configuration of the computer shown in FIG. 1;

FIG. 3 is an exemplary block diagram showing an exemplary arrangement mainly including a power supply controller (PSC) and a power supply circuit used in the computer shown in FIG. 1;

FIG. 5 is an exemplary view showing various exemplary parameters used in charge control processing executed by the computer shown in FIG. 1; and FIG. 6 is an exemplary view showing various exemplary parameters used in charge control processing executed by the computer shown in FIG. 1.

DETAILED DESCRIPTION

Various embodiments according to the invention will be described hereinafter with reference to the accompanying drawings. In general, according to one embodiment of the invention, an information processing apparatus powered by a battery and an external power supply, includes: a power supply circuit which comprises a temperature sensor and converts power obtained from the external power supply and supplies a first charge current to the battery; and a controller which supplies a current to the battery with a second charge current smaller than the first charge current if a temperature received from the temperature sensor has exceeded a threshold, and supplies the current to the battery with the first charge current if both the temperature received from the temperature sensor and a battery level have exceeded corresponding thresholds.

An embodiment of the present invention will now be described with reference to the accompanying drawing.

The arrangement of an information processing apparatus according to an embodiment of the present invention will be explained first with reference to FIGS. 1 and 2. This information processing apparatus is implemented as, e.g., a portable notebook type personal computer 10 drivable by a battery.

Figure 1:
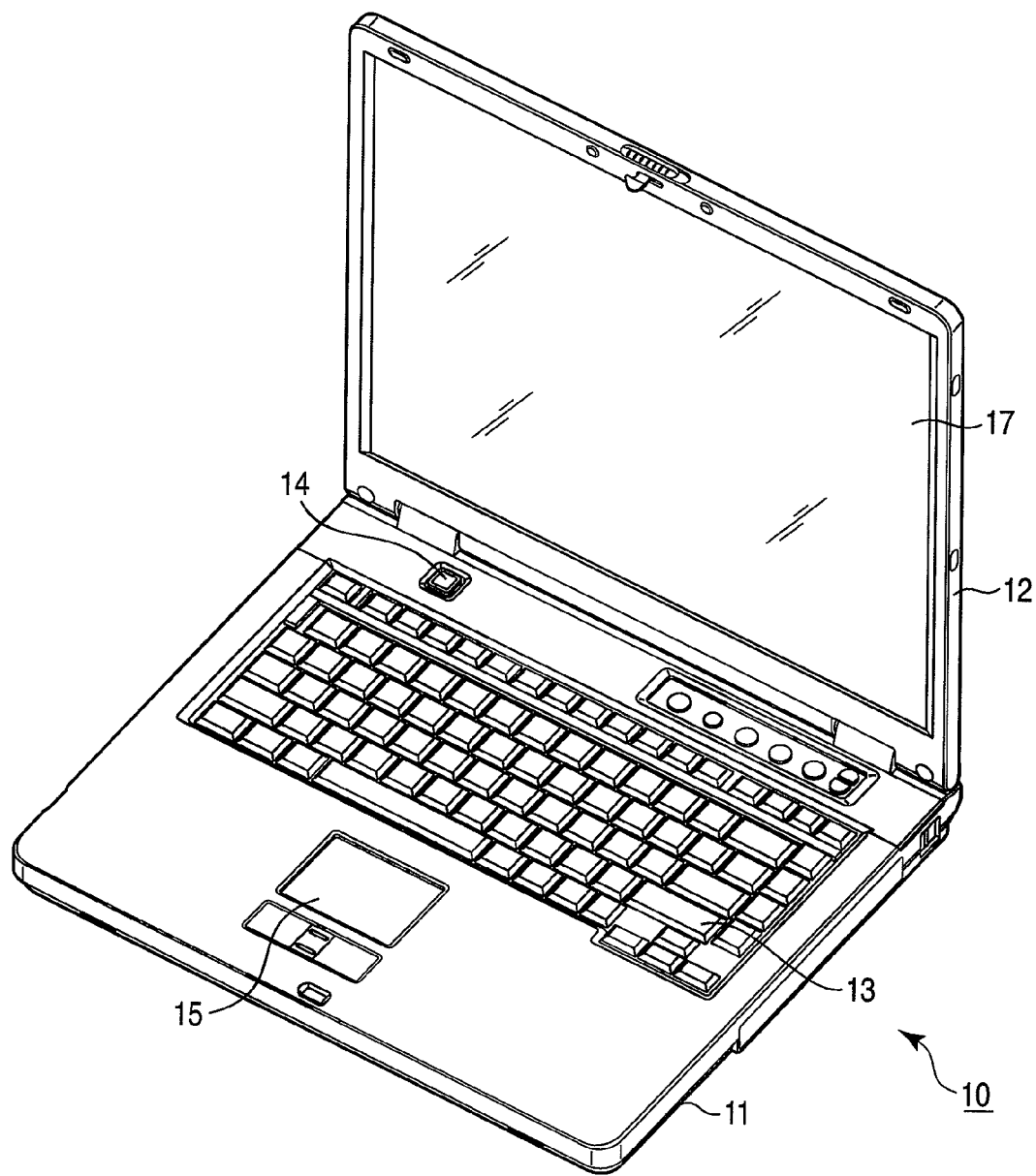
FIG. 1 is an exemplary perspective view showing an exemplary outer appearance of a computer according to an embodiment of the present invention.

FIG. 1 is a perspective view of the computer 10 whose display unit is open. The computer 10 comprises a computer main body 11 and a display unit 12. The display unit 12 incorporates a display device formed from an LCD (Liquid Crystal Display) 17. The display screen of the LCD 17 is located almost at the center of the display unit 12.

The display unit 12 is attached to the computer main body 11 so as to freely pivot between an open position and a close position. The computer main body 11 has, for example, a thin box-shaped case to which a battery is detachably attached. The battery is attached to a battery accommodation space provided in, e.g., the bottom surface (not shown) of the computer main body 11.

A keyboard 13, a power button switch 14 to power on/off the computer 10, and a touch pad 15 are arranged on the upper surface of the computer main body 11.

The system configuration of the computer 10 will be described next with reference to FIG. 2.

As shown in FIG. 2, the computer 10 comprises a CPU 111, north bridge 114, main memory 115, graphics controller 116, south bridge 117, BIOS-ROM 120, hard disk drive (HDD) 121, optical disk drive (ODD) 122, various PCI devices 123, embedded controller/keyboard controller IC (EC/KBC) 140, power supply controller (PSC) 141, power supply circuit 142, AC adapter (external power supply) 143, battery 150, and the like.

The CPU 111 is a processor provided to control the operation of the computer 10 and executes an operating system and various application programs which are loaded from the HDD 121 to the main memory 115. The CPU 111 also executes a system BIOS (Basic Input Output System) stored in the BIOS-ROM 120. The system BIOS is a program to control the hardware.

The north bridge 114 is a bridge device which connects the local bus of the CPU 111 to the south bridge 117. The north bridge 114 incorporates a memory controller that controls access to the main memory 115. The north bridge 114 also has a function of executing communication with the graphics controller 116 via a PCI Express bus or the like.

The graphics controller 116 is a display controller which controls the LCD 17 serving as the display monitor of the computer 10. The graphics controller 116 includes a video memory (VRAM) 116A. A video signal that forms a display image to be displayed on the LCD 17 is generated from display data written in the video memory (VRAM) 116A by the OS/application program.

The south bridge 117 is connected to a PCI bus 1 to execute communication with the PCI device 123 via the PCI bus 1. The south bridge 117 incorporates an IDE (Integrated Drive Electronics) controller and a serial ATA controller to control the hard disk drive (HDD) 121 and the optical disk drive (ODD) 122.

The embedded controller/keyboard controller IC (EC/KBC) 140 is a one-chip microcomputer on which an embedded controller for power management and a keyboard controller to control the keyboard (KB) 13 and the touch pad 15 are integrated. The EC/KBC 140 has a function of powering on/off the computer 10 in accordance with a user operation on the power button switch 14. Power on/off control of the computer 10 is executed by the cooperation of the EC/KBC 140 and the power supply controller (PSC) 141. Upon receiving an ON signal transmitted from the EC/KBC 140, the power supply controller (PSC) 141 powers on the computer 10 by controlling the power supply circuit 142. Upon receiving an OFF signal transmitted from the EC/KBC 140, the power supply controller (PSC) 141 powers off the computer 10 by controlling the power supply circuit 142.

The power supply controller (PSC) 141 also has a function of determining whether the battery 150 is attached to the computer main body 11, a function of reading out various kinds of parameter information (e.g., remaining charge time information corresponding to the residual battery capacity, battery level threshold, power supply circuit temperature threshold, and charge current value) stored in the power supply controller (PSC) 141 in advance and setting them in the power supply circuit 142, and a function of determining whether the external power supply (AC adapter 143) is connected to the computer main body 11. The power supply controller (PSC) 141 sets the determination result on the status register in the EC/KBC 140. The power supply controller (PSC) 141 receives the information of the residual capacity of the battery 150 via a serial bus 2.

The power supply circuit 142 generates operation power to each component with power from the battery 150 attached to the computer main body 11 or power from the AC adapter 143 connected to the computer main body 11 as an external power supply. When the external power supply (AC adapter 143) is connected to the computer main body 11, the power supply circuit 142 generates operation power to each component with power from the external power supply and simultaneously charges the battery 150 with the power from the external power supply. The power supply circuit 142 incorporates a temperature sensor 200. The power supply controller (PSC) 141 receives temperature information measured by the temperature sensor 200.

The battery 150 includes a plurality of secondary cells and a nonvolatile memory 151. The nonvolatile memory 151 stores rating information representing the capability of the battery 150 in advance. The rating information includes, for example, a discharge current rating (A) representing the maximum discharge current of the battery 150, the rated capacity (Ah) of the battery 150, cell count information representing the number of secondary cells mounted in the battery 150, a cycle count representing the number of times of charge/discharge execution, and the sum of use times of the battery 150.

The EC/KBC 140, power supply controller (PSC) 141, power supply circuit 142, and battery 150 are connected to each other via the serial bus 2 such as an I2C bus. During the period the battery 150 is being attached to the computer main body 11 or during the period the AC adapter 143 is being connected to the computer main body 11, the power supply circuit 142 always supplies operation power to the EC/KBC 140 and the power supply controller (PSC) 141.

FIG. 3 is a block diagram showing an arrangement mainly including the power supply controller (PSC) 141 and the power supply circuit 142.

The power supply circuit 142 converts power supplied from the AC adapter 143 with a DC/DC converter or the like to generate a charge current. The power supply circuit 142 comprises the temperature sensor 200. The power supply controller (PSC) 141 comprises a control unit 300 and a storage unit 301. The control unit 300 receives temperature information from the temperature sensor 200 in the power supply circuit 142. The control unit 300 also receives residual battery capacity information from the battery 150 via the serial bus 2.

The storage unit 301 stores various parameters such as the residual battery capacity, remaining charge time information 301$a$, battery level threshold 301$b$, power supply circuit temperature threshold 301$c$, and charge current value 301$d$. The various parameters include, e.g., a charge current value to be supplied to the battery 150, a temperature rise value per time corresponding to the charge current value, and remaining charge time corresponding to the battery level. If the temperature received from the temperature sensor 200 in the power supply circuit 142 has exceeded the threshold, the control unit 300 controls to supply a current to the battery 150 with a second charge current that is a normal charge current smaller than a first charge current.

On the other hand, if the temperature received from the temperature sensor 200 in the power supply circuit 142 has exceeded the threshold, and the remaining power of the battery 150 has exceeded the battery level threshold 301$b$, the control unit 300 controls to supply a current to the battery 150 with the first charge current that is a quick charge current.

A case will be explained in which a first temperature threshold and a second temperature threshold higher than the first temperature threshold are set as the thresholds of the power supply circuit temperature. If the temperature received from the temperature sensor 200 in the power supply circuit 142 has exceeded the first temperature threshold, the control unit 300 controls the power supply circuit 142 to supply a current to the battery 150 with the second charge current (normal charge current) smaller than the first charge current (quick charge current). If the temperature has exceeded the second temperature threshold, the control unit 300 controls the power supply circuit 142 to stop current supply to the battery 150.

In addition, if the temperature has exceeded the first temperature threshold, the control unit 300 reads out, from the storage unit 301 based on the temperature rise value per time, a charge current value which does not exceed the second temperature threshold within the remaining charge time, and controls the power supply circuit 142 based on the readout charge current value (to be described later). The remaining charge time is set stepwise in correspondence with battery levels (e.g., 20%, 40%, 60%, and 80%). If the storage unit 301 stores no charge current value which does not make the temperature exceed the second temperature threshold, the control unit 300 controls with the smallest one of the charge current values stored in the storage unit 301 (to be described later). Upon determining that the battery 150 is fully charged, the control unit 300 causes the power supply circuit 142 to stop supplying the charge current to the battery 150.

Figure 4:
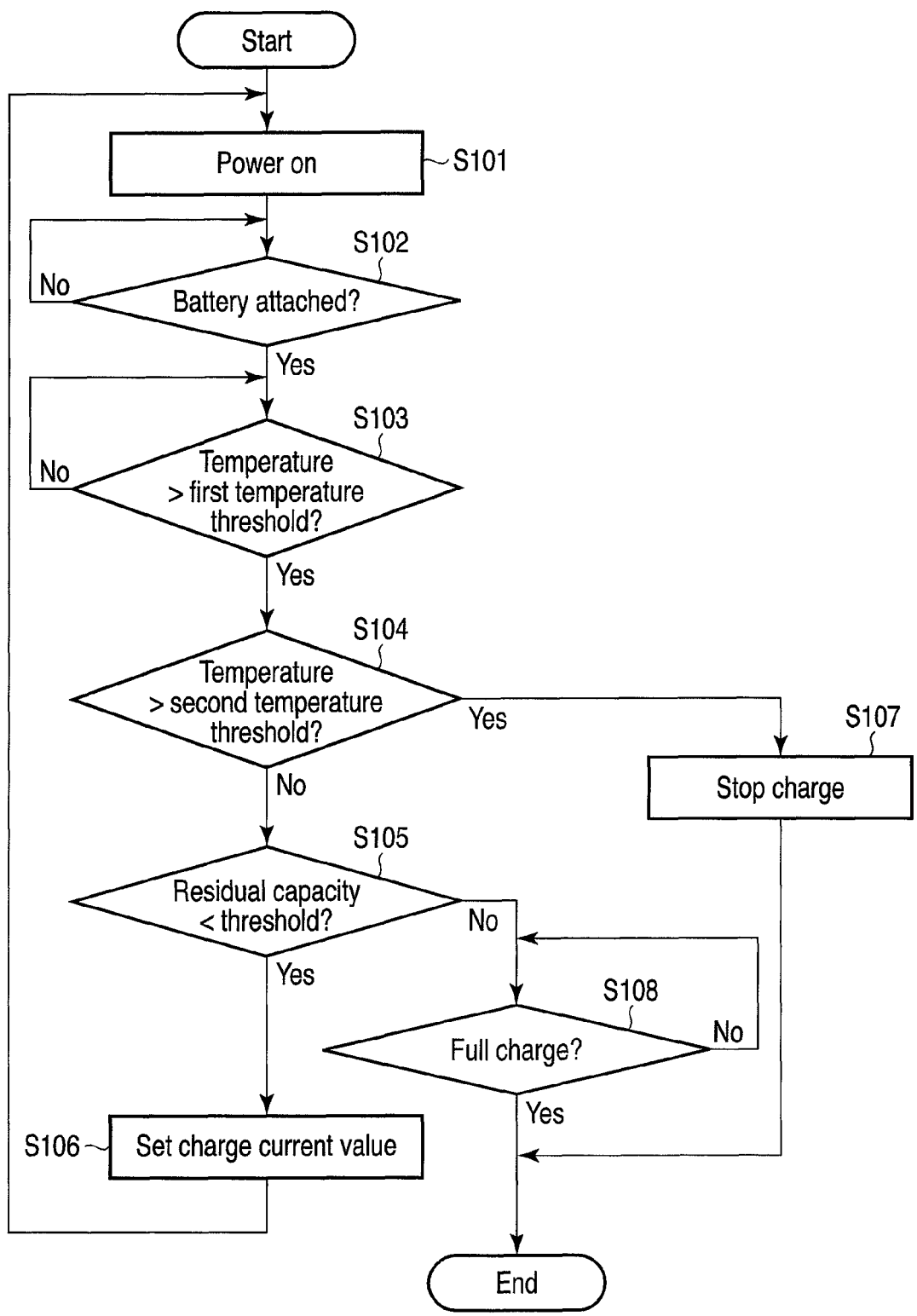
FIG. 4 is an exemplary flowchart illustrating an exemplary procedure of charge control processing executed by the computer shown in FIG. 1.

An example of the procedure of charge control processing of optimally charging the battery 150 will be explained next with reference to the flowchart in FIG. 4.

When the computer 10 is powered on (block S101), the power supply controller (PSC) 141 determines whether the battery 150 has been attached to the computer main body 11 (block S102). The power supply controller (PSC) 141 monitors, e.g., the voltage value of one of electrodes for communication with the battery 150 which are provided in the battery accommodation space in the computer main body 11, and when the voltage value has changed to a predetermined logic level, determines that the battery 150 is attached to the computer main body 11. Even in a state in which the external power supply (AC adapter 143) is not connected to the computer main body 11, when the battery 150 is attached, operation power is supplied to the power supply controller (PSC) 141 and the EC/KBC 140 at that point of time. Hence, even if the external power supply (AC adapter 143) is not connected to the computer main body 11, the power supply controller (PSC) 141 can detect attachment of the battery 150 to the computer main body 11.

Upon determining in block S102 that the battery 150 is attached to the computer main body 11 (YES in block S102), the power supply controller (PSC) 141 determines whether the temperature of the power supply circuit has exceeded the first temperature threshold (block S103). The first temperature threshold is one of the temperature thresholds of the power supply circuit 142 which are stored in the storage unit 301.

Upon determining in block S103 that the temperature of the power supply circuit 142 has exceeded the first temperature threshold (YES in block S103), the power supply controller (PSC) 141 determines whether the temperature of the power supply circuit has exceeded the second temperature threshold (block S104). The second temperature threshold is one of the temperature thresholds of the power supply circuit 142 which are stored in the storage unit 301 (note that of the temperature thresholds of the power supply circuit 142, the above-described first temperature threshold is set at, e.g., 50° C., and the second temperature threshold is set at, e.g., 60° C.)

Upon determining in block S104 that the temperature of the power supply circuit 142 has exceeded the second temperature threshold (YES in block S104), the power supply controller (PSC) 141 causes the power supply circuit 142 to stop supplying the charge current to the battery 150 (block S107). For example, when the second temperature threshold is set at 60° C. as described above, and the temperature of the power supply circuit 142 has exceeded 60° C., the power supply controller (PSC) 141 stops charge current supply for the safety. On the other hand, upon determining in block S104 that the temperature of the power supply circuit 142 has not exceeded the second temperature threshold (NO in block S104), the power supply controller (PSC) 141 determines whether the residual battery capacity is smaller than a threshold (block S105). Upon determining in block S105 that the residual battery capacity is smaller than the threshold (YES in block S105), the power supply controller (PSC) 141 decides the charge current value based on various kinds of parameter information (remaining charge time information corresponding to the residual battery capacity, battery level threshold, and power supply circuit temperature threshold) and sets the decided charge current value in the power supply circuit 142 (block S106).

When the power supply controller (PSC) 141 has determined in block S105 that the residual battery capacity is not smaller than the threshold (for example, when the residual battery capacity is equal to or larger than its threshold, i.e., 80%: NO in block S105), the process advances to block S108. In block S108, normal quick charge (the charge current value is, e.g., 5.0 A or more) until the power supply controller (PSC) 141 determines that the battery is fully charged. Upon determining in block S108 that the battery is fully charged, the power supply controller (PSC) 141 causes the power supply circuit 142 to stop supplying the charge current to the battery 150. As described above, if both the temperature threshold (=first temperature threshold) and the battery level threshold have been exceeded (NO in block S104 and NO in block S105), a current is supplied to the battery 150 with the first charge current (the current of normal quick charge). In this case, for example, the residual battery capacity is equal to or larger than the battery level threshold, i.e., 80%, and the time up to full charge is expected to be short. For this reason, the battery is charged with the fastest charge method (large charge current value) such as quick charge regarding its performance. This allows to charge the battery in the minimum charge time without degrading it.

FIGS. 5 and 6 are views showing examples of various parameters used in charge control processing executed by the computer according to this embodiment.

FIG. 5 shows parameters representing temperature rises per unit time corresponding to charge currents, and parameters representing the relationships between the remaining charge amounts and charge times of the battery corresponding to the charge currents. FIG. 6 shows parameters representing the first temperature threshold, second temperature threshold, and residual capacity (remaining charge amount) threshold. Assume that the temperature information of the power supply circuit 142 received by the control unit 300 represents, e.g., 51° C., the residual battery capacity is 40%, and the charge current value (first charge current) of quick charge (the charge method capable of charging the battery in the minimum time regarding its performance) is 5.0 A (first charge current).

As described above, if the received temperature information of the power supply circuit 142 represents 51° C., the temperature is higher than the first temperature threshold 50° C. and lower than the second temperature threshold 60° C. Additionally, if the received residual battery capacity is 40%, it is lower than the residual battery capacity threshold 80% shown in FIG. 6. In this case, the control unit 300 executes calculation (division) of obtaining the difference (9° C.) between the second temperature threshold 60° C. and the current temperature 51° C. of the power supply circuit 142. That is, the control unit 300 determines that the temperature of the power supply circuit 142 can still rise by 9° C. The control unit 300 then receives the time necessary until the current residual battery capacity 40% reaches 100%. The charge time is preferably shorter. Hence, the control unit 300 receives the time starting from, e.g., the largest charge current (5.0 A) that is a large current to minimize the charge time.

When charging the battery with the above-described charge current 5.0 A, the temperature rise per time is 60° C./h (6° C./0.1 h: FIG. 5). It is therefore determined by calculation of the control unit 300 that the temperature of the power supply circuit 142 rises by 9° C. or more (60×0.5=30° C.) in the time (0.5 h) required up to full charge. That is, the control unit 300 determines that the charge current 5.0 A is unsuitable. Similarly, for a charge current 4.0 A, the temperature rise per time is 40° C./h (4° C./0.1 h: FIG. 5). It is therefore determined by calculation of the control unit 300 that the temperature of the power supply circuit 142 rises by 9° C. or more (40×0.6=24° C.) in the time (0.6 h) required up to full charge. That is, the control unit 300 determines that the charge current 4.0 A is unsuitable. Next, for a charge current 3.0 A, the temperature rise per time is 15° C./h (1.5° C./0.1 h: FIG. 5). It is therefore determined by calculation of the control unit 300 that the temperature of the power supply circuit 142 rises by 9° C. or more (15×0.8=12° C.) in the time (0.8 h) required up to full charge. That is, the control unit 300 determines that the charge current 3.0 A is unsuitable. For a charge current 2.0 A, the temperature rise per time is 7° C./h. It is therefore determined by calculation of the control unit 300 that the temperature of the power supply circuit 142 rises within the range lower than 9° C. (7×1.2=8.4° C.) in the time (1.2 h) required up to full charge. For this reason, the control unit 300 determines that the charge current 2.0 A is suitable. The control unit 300 sets the charge current at 2.0 A.

This prevents such an increase in the temperature of the power supply circuit 142 that forces to stop charge. Additionally, setting an appropriate charge current value for battery charge makes it possible to complete charge in the minimum charge time. Note that upon determining that the storage unit stores no charge current value which does not make the temperature exceed the second temperature threshold 60° C. (for example, when the temperature rises by 9° C. or more even if the charge current is set at 1.0 A), the control unit 300 reads out and sets the smallest one (1.0 A in FIG. 5) of the charge current values stored in the storage unit. When the temperature has exceeded the temperature threshold (=first temperature threshold), the control unit supplies a current to the battery 150 with the second charge current smaller than the first charge current.

The present invention has as its object to provide an information processing apparatus capable of performing appropriate charge control with various parameters and a change in the temperature of the power supply circuit of a battery.

As described above, according to the embodiment, it is possible to perform appropriate charge control with various parameters and a change in the temperature of the power supply circuit of a battery. This prevents such an increase in the temperature of the power supply circuit that forces to stop charge. Additionally, setting an appropriate charge current value for battery charge makes it possible to complete charge in a short charge time.

The information processing apparatus of the embodiment is not limited to the computer 10 but can also be implemented by various information processing apparatuses such as a PDA (Personal Digital Assistant).

The present invention is not exactly limited to the above embodiments, and constituent elements can be modified in the stage of practice without departing from the spirit and scope of the invention. Various inventions can be formed by properly combining a plurality of constituent elements disclosed in the above embodiments. For example, several constituent elements may be omitted from all the constituent elements described in the embodiments. In addition, constituent elements throughout different embodiments may be properly combined.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus powered by a battery or an external power supply, comprising:
    a power supply circuit comprising a temperature sensor configured to output a value indicative of temperature, and configured to convert power obtained from an external power supply and to supply a first charge current to the battery; and
    a controller configured to supply to the battery a second charge current smaller than the first charge current when the value exceeds a temperature threshold during supply of the first charge current to the battery and when a residual battery charge is not more than a residual threshold, and to continue to supply the first charge current to the battery when the value exceeds the temperature threshold during supply of the first charge current to the battery and when the residual battery charge exceeds the residual threshold.

2. The apparatus of claim 1, comprising a first temperature threshold and a second temperature threshold higher than the first temperature threshold,
    wherein when the value exceeds the second temperature threshold, the controller is configured to stop supplying the current to the battery.

3. The apparatus of claim 2, further comprising:
    a storage unit configured to store
        a charge current value to be supplied to the battery,
        a temperature rise rate value corresponding to the charge current value, and
        a residual battery charge and a remaining charge time corresponding to the charge current value, and
    wherein when the value exceeds the first temperature threshold and the residual battery charge is not more than the residual threshold, the controller is configured to read out a charge current value from the storage unit based on the temperature rise rate value, which does not make the value exceed the second temperature threshold within the remaining charge time, and to control the power supply circuit according to a readout charge current value.

4. The apparatus of claim 3, wherein the remaining charge time corresponding to the residual battery charge is set stepwise.

5. The apparatus of claim 3, wherein the controller is configured to read out a smallest charge current value stored in the storage unit, when the controller determines that the storage unit does not store the charge current value which does not make the value exceed the second temperature threshold.

6. The apparatus of claim 1, wherein upon determining that the battery is fully charged, the controller is configured to stop the supply of the current to the battery.

* * * * *